US007302701B2

(12) United States Patent
Henry (10) Patent No.: US 7,302,701 B2
(45) Date of Patent: Nov. 27, 2007

(54) TRANSMITTER DEVICE FIREWALL (75) Inventor: Steven G. Henry, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 915 days.

(21) Appl. No.: 10/151,670

(22) Filed: May 20, 2002

(65) Prior Publication Data

US 2003/0217282 A1    Nov. 20, 2003

(51) Int. Cl.
    G06F 9/00    (2006.01)
(52) U.S. Cl. ............... 726/11; 726/2; 726/4; 713/168; 358/1.15; 709/206
(58) Field of Classification Search ............... 713/200, 713/168; 709/206, 246, 321; 358/402, 1.15; 726/1, 2, 4, 11
    See application file for complete search history.

(56) References Cited

U.S. PATENT DOCUMENTS 4,750,175 A * 6/1988 Brenneman et al. ........ 370/216

| 6,717,689 | B1 * | 4/2004 | Endo et al. ................. 358/1.15 |
| 6,880,019 | B1 * | 4/2005 | Toyoda ....................... 709/238 |
| 6,880,091 | B1 * | 4/2005 | Mattis et al. ................... 726/5 |
| 2002/0083114 | A1 * | 6/2002 | Mazzagatte et al. ........ 709/100 |
| 2002/0097431 | A1 * | 7/2002 | Ikegami ..................... 358/1.15 |
| 2002/0181006 | A1 * | 12/2002 | Chrisop et al. ............. 358/1.14 |
| 2002/0188646 | A1 * | 12/2002 | Terrill et al. ................. 709/101 |
| 2003/0043416 | A1 * | 3/2003 | Rublee et al. ............... 358/402 |
| 2003/0046445 | A1 * | 3/2003 | Witt et al. ................... 709/321 |
| 2003/0151766 | A1 * | 8/2003 | Clough et al. ............. 358/1.15 |
| 2003/0172115 | A1 * | 9/2003 | Motoyama .................. 709/206 |
| 2003/0182581 | A1 * | 9/2003 | Isozaki ........................ 713/201 |

* cited by examiner

*Primary Examiner*—Nasser Moazzami
*Assistant Examiner*—Shanto M Z Abedin (57) ABSTRACT

A transmitter device receives a request from a user for transmission of user message data to a requested network address on a network. A determination is made at the transmitter device whether or not the requested transmission is authorized. A transmission is sent of the user message data to the requested network address when the requested transmission is authorized. A diagnostic is issued when the requested transmission is unauthorized.

24 Claims, 3 Drawing Sheets

TRANSMITTER DEVICE FIREWALL

FIELD OF THE INVENTION

The present invention relates generally to transmitter devices, and more particularly to transmitter device security.

BACKGROUND OF THE INVENTION

Many peripherals to computer networks include a scanner component. One example of such a peripheral is an "all-in-one" device, also known as a multifunction peripheral (MFP) in that it has the capability to perform the multiple functions of scanning hardcopy documents, copying, and printing. Another example is a digital network copier that scans in documents from an automatic document feeder, does high volume copying, and has the capabilities of binding, collating, folding, stacking, stapling, stitching, edge-trimming, paginating, and printing on substrates of varied composition. Each of these peripherals, when in communication with an interconnecting network, can be described as being a transmitter device.

A transmitter device is an appliance that has a keyboard, a display, and a scanner. The transmitter device need not have a printer. A digital camera is a type of transmitter device, but in comparison to the foregoing, it is not as useful for handling documents and typically lacks the resolution and ability to rapidly and repetitively transfer information after scanning to a repository. Transmitter devices are generally distinguishable from devices such as laptop PCs (personal computers) and pocket PCs by their limited purpose and limited user interface or input/output capabilities. For example, a typical user interface for a transmitter device 102 includes a front menu panel with limited screen space and a limited number of buttons. In addition, a transmitter device 102 is typically oriented toward performing one general task such as scanning. By contrast, devices such as laptop and pocket PCs often provide multiple and varied means of input/output such as a full screen display, a QWERTY keyboard, a trackball mouse, speakers, microphones, PCMCIA (Personal Computer Memory Card International Association) slots, portable media drives and the like. These devices are capable of performing multiple functions through executing various software applications such as word processing applications, spreadsheet applications, financial applications, network browsers and network messaging applications.

In an exemplary digital transmitting operation, a hardcopy of a document can be presented to the scanner portion of a transmitter device. After scanning, the transmitter device transforms the scanned image into a digital representation of the document that is then saved in a data format, such as in a bit map data format or in a Portable Document Format (PDF). Electronic messaging can be used to send an electronic mail (e-mail) from the transmitter device with an attachment of the document in the data format. The e-mail can be sent to recipients over the interconnecting network, where the recipients have an e-mail address that a user manually enters at the transmitter device or that user specifies using a defined list of recipient e-mail addresses. Similarly, documents can be scanned from a transmitter device and deposited in directories on workstations and servers in the corporate intranet or on the general internet.

A corporation typically configures a corporate network as one or more intranets to share corporate resources and information. An intranet is only accessible by a corporation's, or organization's members, employees, or others with authorization. Intranet web sites look and act just like any other web site, but a firewall surrounding the intranet fends off unauthorized access. A firewall examines each message entering or leaving the intranet and blocks those that do not meet specified predetermined security criteria.

Network administrators within an organization typically use one or more device management applications to manage transmitter devices within an organizational or corporate intranet. As an illustration of such transmitter device management applications, consider that Hewlett Packard (HP) JetAdmin® and HP Web JetAdmin® products are used by network administrators to discover, install, monitor and troubleshoot network-connected transmitter devices in an intranet.

Network administrators typically configure firewalls to filter, or block management protocol packets, such as SNMP packets from being sent into and out of organizational, or corporate intranets. Such blocking of management protocol packets prevents unauthorized access and control of transmitter devices within corporate intranets. Thus, transmitter devices are protected from unauthorized access outside of the intranet by one or more intranet firewalls.

Transmitter devices can be stand-alone devices operating in an intranet or they can be dedicated to a host computer in the intranet. Once access is gained by a user to the intranet, the user will also have access to use of any transmitter device within the intranet. An administrator of the intranet may wish to prevent certain intranet users from using certain functions of certain transmitter devices in an intranet. Intranet firewalls will not prevent this access to and use of the transmitter devices by intranet users. It would be beneficial to prevent unauthorized access to transmitter devices within an intranet by intranet users. It may also be important to limit emails that are sent to be for corporate use only. Lastly, it may be important to track where emails are being sent and what documents are being placed onto disk drives within the corporate intranet or out to the internet. Consequently, there is a need for improved methods, apparatuses, and programs that can provide such a capability.

SUMMARY OF THE INVENTION

A transmitter device receives a request from a user for transmission of user message data to a requested network resource at a requested network address on a network. A determination is made at the transmitter device if the requested transmission is proscribed. A transmission is sent of the user message data to the requested network resource at the requested network address when the determination determines the requested transmission not to be proscribed. A diagnostic is issued when the determination determines the requested transmission to be proscribed.

These and other features of the present invention will become more fully apparent from the following description and appended claims, or may be learned by the practice of the invention as set forth hereinafter.

DESCRIPTION OF THE DRAWINGS

A more complete understanding of the various methods and apparatuses of the present invention may be had by reference to the following detailed description when taken in conjunction with the accompanying drawings wherein the same reference numbers are used throughout the drawings to reference like components and features, and wherein.

DETAILED DESCRIPTION

The methods, apparatuses, and programs described herein relate to the installation and use of a local firewall security management system for a transmitter device. Preferably, the firewall will operate inside a transmitter device that is in communication with an intranet. An intranet administrator can both install and maintain the firewall at the transmitter device. Alternatively, the firewall may be preinstalled but later configured by an administrator with appropriate security rights.

The functionality of the firewall installed in the transmitter device can be configured to serve the needs of the intranet administrator. These needs may be directed to an outright prohibition of any transmission of documents outside of the intranet from a transmitter device. For instance, a user may willfully or inadvertently enter an incorrect and unauthorized electronic mail (i.e., e-mail) address at the transmitter device. But for the presence of the transmitter device local firewall security management system, the improper address would cause a security breach by the transmission of a set of documents that were scanned in at and then sent from the transmitter device to the unauthorized e-mail address or network location.

The need for security at the transmitter device may also be directed to particular limitations placed on certain users with respect to access to and the operations performable by the transmitter device. By way of example, the firewall can be installed so as to prohibit certain transmissions inside of the intranet, or transmissions to one or more e-mail addresses in particular lists of Internet e-mail addresses, or to a particular uniform resource locator (URL). Moreover, the permission for these types of transmissions may be conditioned upon the identity of the user of the transmitter device.

Other functionalities of a transmitter device local firewall security management system are contemplated, such as a system of access control lists (ACL) limiting use of the transmitter device to certain users or classes of users. Where a transmitter device may have a variety functions it is capable of performing, there is contemplated a system of function control lists (FCL) that limit use of the transmitter device to certain of its functions, which may or may not be conditioned upon the user or upon a class of users. For instance, only certain users may be permitted to use the functions or scanning documents with the highest resolution capability of the transmitter device. Color scanning, transmission, and/or printing may also be limited based upon ACL/FCL systems maintained at the transmitter device by the local firewall security management system.

One of the capabilities of the firewall installed in the transmitter device is the transmission of message data to security personal, such as a network administrator, when an attempt is made at the transmitter device for an unauthorized access or an unauthorized use by an otherwise authorized user of the transmitter device. For example, an authorized user of the transmitter device may attempt to reconfigure or otherwise alter permissible uses of the transmitter device. If the user does not have a sufficient access level as recorded in the ACL/FCL system, the local firewall security management system determines that the attempted use of the transmitter device was without proper user permission status. The local firewall security management system then coordinates the transmission of message data from the transmitter device to a predetermined security related e-mail address or other reporting mechanism. Preferably, the message data will contain a representation and description of the attempted unauthorized access and use. Tracking and control of transmitter device security can be established within the intranet administration using a transmitter device firewall security management system.

Exemplary System for Configuration of a Transmitter Device

Figure 1:
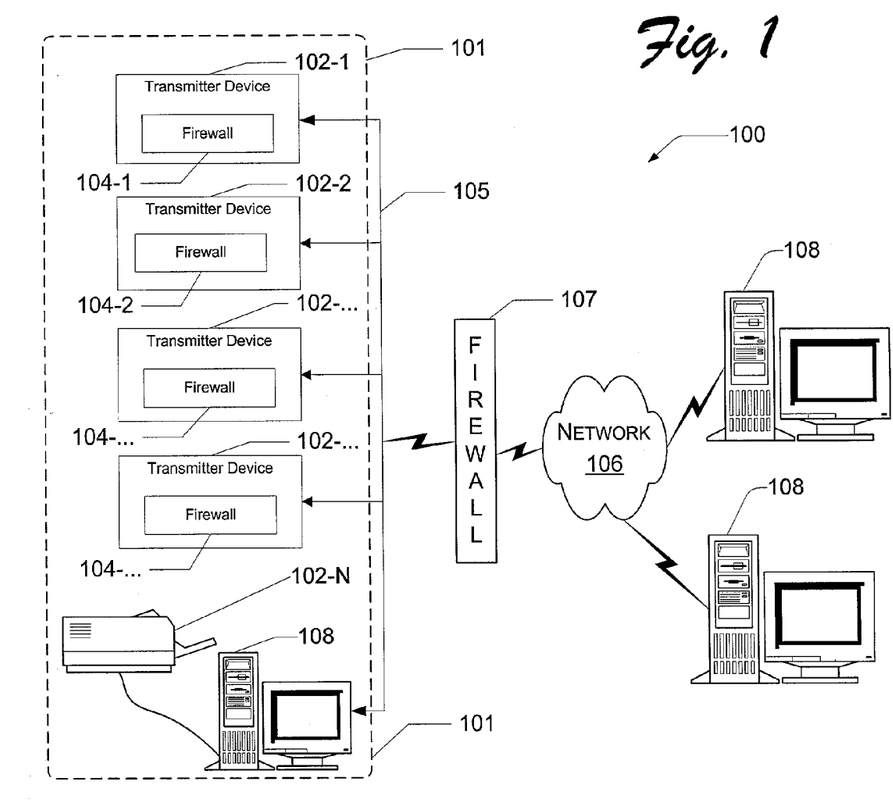
FIG. 1 is a block diagram depicting a computing and communication environment having a plurality of transmitter devices within an intranet and in a system environment suitable for providing local access to the transmitter devices.

FIG. 1 is a block diagram illustrating an example of a system environment 100 suitable for implementing a transmitter device local firewall security management system of transmitter devices 102-1 through 102-N that are within an intranet 101. Each transmitter devices 102-1 through 102-N has a respective firewall security management system 104-1 through 104-N. While transmitter devices 102-1 through 102-N are illustrated and discussed as digital transmitter devices, it should be recognized that the transmitter devices may also be analog transmitter devices or a mixture of both.

Intranet 101 can include its own firewall 107 that limits access outside of intranet 101 to any resource within intranet 101, including host computer(s) 108 and transmitter devices 102-1 through 102-N. Transmitter devices 102-1 through 102-N are in communication to an interconnected network 106 through a communication pathways 105. A series of host computer(s) 108 are in communication with interconnected network 106 both inside and outside intranet 101. Interconnecting network 106 is representative of one or more communication links, either wired or wireless, that are capable of carrying data between transmitter device 102 and other network resources in communication with interconnecting network 106. In certain exemplary embodiments, interconnecting network 106 includes a local area network (LAN), a wide area network (WAN), an intranet, the Internet, or other similar network. Transmitter device(s) 102 are also typically coupled to host computer(s) 108 either through a direct or network connection.

In one embodiment of the present invention, the system environment 100 contemplates local access to transmitter device 102-$i$ via an input device, such as a touch sensitive menu screen, that is situated on transmitter device 102-$i$. A user accesses the input device for the purpose of entering a user identification (User ID) and other instructions for operations to be performed by the transmitter device 102-$i$. In another embodiment of the present invention, a host computer 108 situated inside intranet 101 sends instructions for operations to be performed by the transmitter device 102-$i$.

As seen in FIG. 1, system 100 is used to manage intranet 101 having transmitter devices 102-$i$ through 102-N that are logically in communication via communication pathways 105. Communication pathways 105 can be a local area network (LAN) or a wide area network (WAN). Firewall 107 for intranet 101 specifically prevents of unauthorized access from a user of interconnected network 106 that is outside intranet 101 to resources that are within intranet 101. Firewall 107 examines each message entering or leaving the intranet and blocks those that do not meet predetermined specified security criteria. In this implementation, the firewall blocks SNMP messages from entering or leaving the intranet 101. It can also prevent unauthorized configuration access to transmitter devices 102-i. Firewall 107 is coupled to interconnected network 106.

Figure 2:
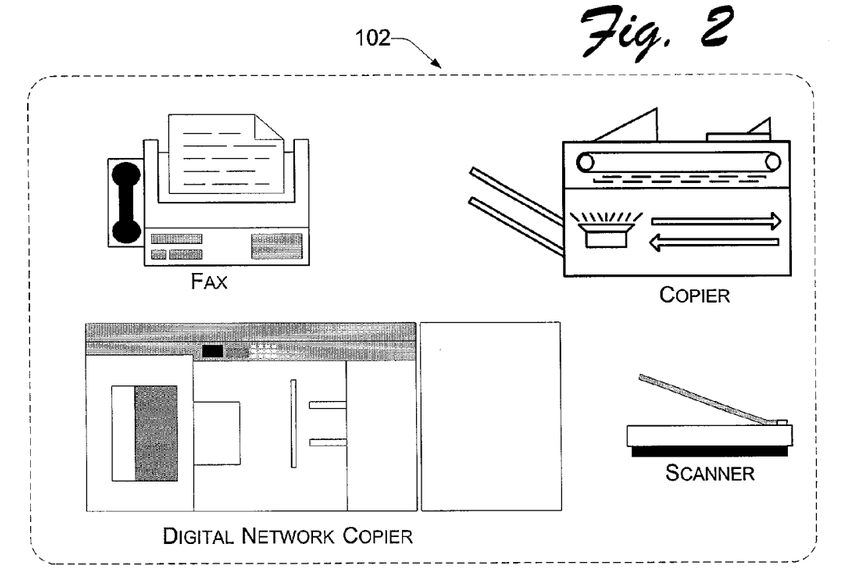
FIG. 2 illustrates various transmitter devices that provide local access for input thereto.

Transmitter devices 102-i can be stand-alone devices or in direct communication with a host computer 108. Transmitter devices include devices such as printers, scanners, copiers, and fax machines, or multifunction peripheral (MFP) devices that combine two or more transmitter devices into a single device. Stand-alone devices include certain transmitter devices that often function while uncoupled or isolated from other devices. Transmitter devices 102 therefore include devices such as standard office copiers, digital network copiers, scanners and fax machines like those shown in FIG. 2.

Exemplary Embodiment of an Apparatus Firewall

Figure 3:
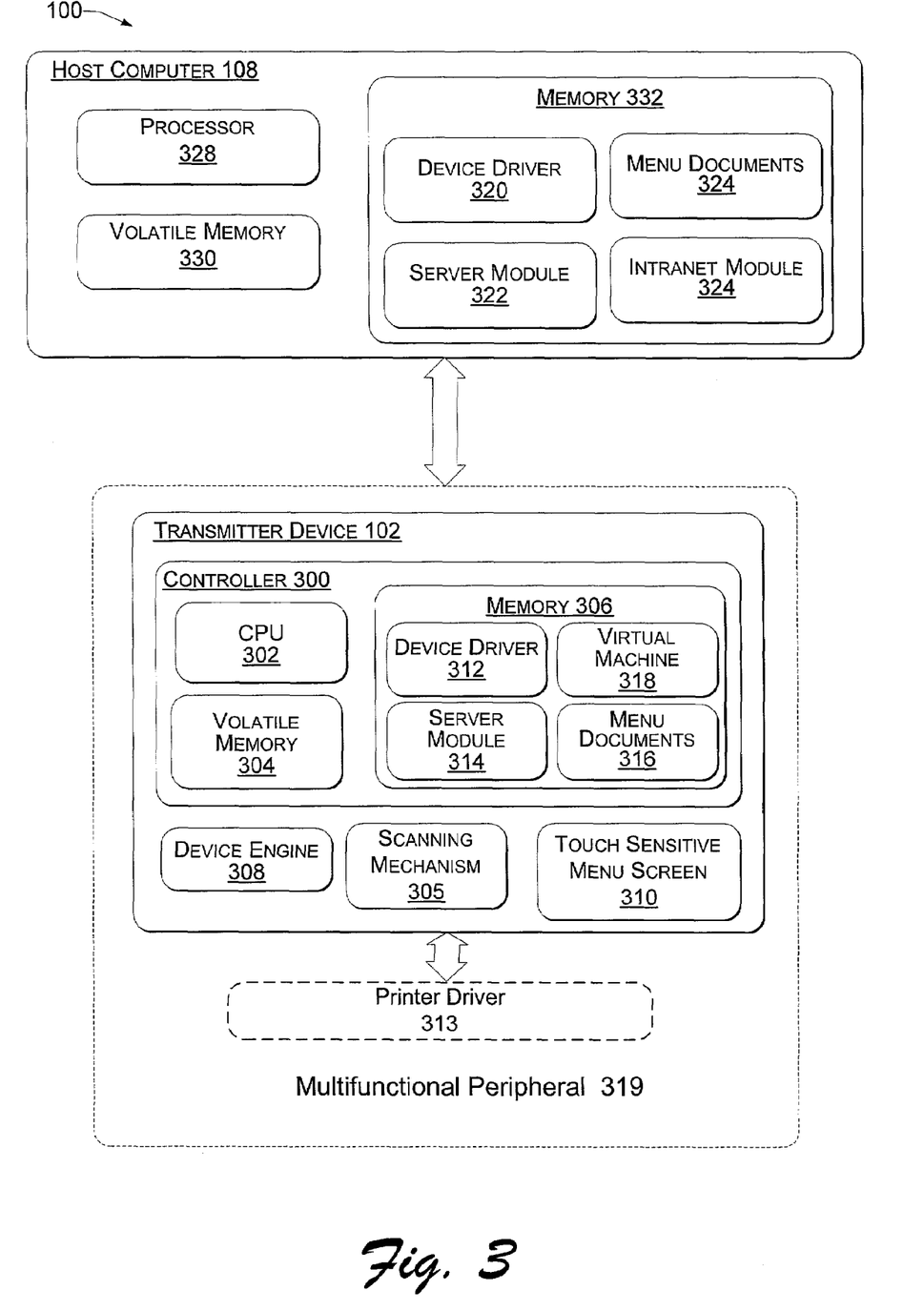
FIG. 3 is a block diagram illustrating a transmitter device in communication with a host computer in a system such as that shown in FIG. 1.

FIG. 3 illustrates an embodiment of the system 100 of FIG. 1 in greater detail. In accordance with still other aspects of the present invention, transmitter device 102 may be included within a multiple function peripheral (MFP) device 319. As its name implies, MFP device 319 is configured to provide multiple functions. In this example, the functions provided by MFP device 319 include those provided by transmitter device 102 and a printer device 313. Consequently, the user of transmitter device 102 may also print out a hardcopy of any applicable portions of the message data.

In general, the host computer 108 can display menus upon a display device (not shown) the data for which is stored in menu documents 324. Host computer 108 outputs host data to a transmitter device 102 using device driver 320, server module 322, and intranet module 324. The output from host computer 108 to transmitter device 102 can be in a driver format suitable for the transmitter device 102, such as PCL or postscript for printer device 313. One preferred embodiment of the present invention utilizes TCP/IP network protocols to interact with the transmitter device 102.

The peripheral or transmitter device 102 includes a controller 300 that processes the host computer 108 data. The controller 300 typically includes data processing unit or CPU 302, a volatile memory 304 (i.e., RAM), and a non-volatile memory 306 (e.g., ROM, Flash). Transmitter device 102 also includes a device engine 308 and an input device. Preferably, the input device will be locally accessible at transmitter device 102. By way of example, the input device can be a touch sensitive menu screen 310. The touch sensitive menu screen 310 serves as a local user interface for transmitter device 102 by displaying menu pages and accepting user input based on selectable menu items displayed on the menu pages. Touch sensitive menu screen 310 can be used to display a menu page that prompts for and receives input needed to satisfy firewall 104-i of transmitter device 102-i. Preferably, the input will include a receipt e-mail address on a network, as well as a request for a particular function that is to be performed by transmitter device 102-i. By way of example, the particular function requested by the user can be a grey scale scan, color scan, or scan having a particular image resolution.

CPU 302 is operatively coupled to a memory 306, touch sensitive menu screen 310, a scanning mechanism 305, and at least one communication port for interfacing with the interconnecting network 106. When included in MFP device 319, CPU 302 would also be operatively coupled to printer device 313, for example. CPU 302 is representative of any hardware, firmware and/or software that is configured to perform certain functions associated with the operation of transmitter device 102 and, if applicable, MFP 319. Hence, as those skilled in the art will recognize, CPU 302 may include dedicated logic and/or one or more processors configured in accord with software instructions, for example.

Memory 306 is representative of any type of data storage mechanism that can be accessed by at least CPU 302. Memory 306 may therefore include, for example, some form of random access memory (RAM); some form of read only memory (ROM), and/or other like solid-state data storage mechanism. Memory 306 may include a magnetic and/or optical data storage mechanism. Scanning mechanism 305 is representative of any optical scanner technology that may be employed to produce scanned object data upon scanning an object. Such scanning technologies are well known. The resulting scanned object data is provided to CPU 302 and/or stored in memory 306. Controller 300 processes host data and manage device functions by controlling a device engine 308 and responding to input from a touch sensitive menu screen 310. Controller 300 includes a device driver software 312 stored in a memory 306 and executed on a processor, such as a CPU(s) 302. Memory 306 also includes a server module 314. Server module contains software, firmware, or other logic for the implementation of a local firewall security management system at transmitter device 102. The local firewall security management system includes one or more access control lists (ACL) and function control lists (FCL). The ACLs control access to transmitter device 102 by user ID, for example. The FCLs store those functions that are permissible to for transmitter device 102, which permission may also be conditioned upon a particular user ID in a respective one of the ACLs. The firewall security management system also includes packet filtering capabilities, logging functions, email address and World Wide Web address filtering capabilities.

Server module 314 is also configured to provide menu documents 316 to the touch sensitive menu screen 310. As such, server module 314 is a local server in the sense that it is present within the same transmitter device 102 to which it provides menu documents 316. Menu documents 316 are interpreted by the server module 314 and are configured to display textual and graphical information as menu pages on the touch sensitive menu screen 310.

Within intranet 101 of FIG. 1, host computer 108 can make a request to transmitter device 102-i. The request from host computer 108, which will preferably include a user ID or other identifying characteristic of the user at host computer 108, is processed by the local firewall security management system in server module 314 at transmitter device 102 seen in FIG. 3 as described above.

Graphical keys or buttons presented on menu pages that are displayed by the touch sensitive menu screen 310 offer selectable menu items that are described by accompanying textual information. Menu documents 316 driving the menu pages include embedded script code associated with graphical keys. Selecting a menu item by pressing a graphical key on the touch sensitive menu screen 310 triggers an event which causes a "virtual machine" 318 to interpret and execute the script code associated with the selected graphical key. As such, the virtual machine 318 can be a software module stored in memory 306 that executes on CPU(s) 302 to interpret and execute script code, including code that is associated with the enablement of the local firewall security management system in server module 314 at transmitter device 102. The code can be a script code that is written in JavaScript™ code and that is interpreted and executed on a Java™ Virtual Machine (JVM) 318. The script code can also be written in ChaiServer™ code that is interpreted and executed on a Chai™ Virtual Machine. The script code can also be written in other script code languages such as VBScript or Perl. However, the code can also be written in other software or machine languages including but not limited to C++ or C#. Alternatively, the algorithms can be resident in the machine and programmed in any common embedded processor code.

The script code associated with selectable menu items (i.e., graphical keys or buttons) can be configured to perform the task of receiving a user ID and a request for a function to be performed at transmitter device 102. When so received, the script code associated with selectable menu items will retrieve the relevant ACL and FCL information in order to conduct a comparison of same. The script code executing on CPU 302 of transmitter device 102 can determine if the requesting user has access and if the request of the user can be granted.

The host computer 108 includes a processor 328, a volatile memory 330 (i.e., RAM), and a non-volatile memory 332 (e.g., ROM, hard disk, floppy disk, CD-ROM, etc.). The host computer 108 may be implemented, for example, as a general-purpose computer, such as a desktop personal computer, a laptop, a server, and the like. The host computer 108 may implement one or more software-based device drivers 320 that are stored in non-volatile memory 332 and executed on the processor 328 to configure data into an appropriate format (e.g., PCL, postscript, etc.) and output the formatted data to the transmitter device 102.

Digital transmitter devices 102-i are configured to send an e-mail message, perform file transfer of documents, or notification message to a server, such as host computer 108, for example, either in or out of intranet 101, when an event occurs. For example one such event is receipt of input having an unauthorized user ID or a request for performing an unauthorized function from an otherwise authorized user. In one implementation, the notification message includes information to clearly identify the particular user ID, the requested function and the digital transmitter device at which the request was made. The digital transmitter device can then communicate the e-mail message to the server for the purpose of maintaining an unauthorized access log for each digital transmitter device 102-i.

Exemplary Embodiment of a Method for a Transmitter Device Firewall

Figure 4:
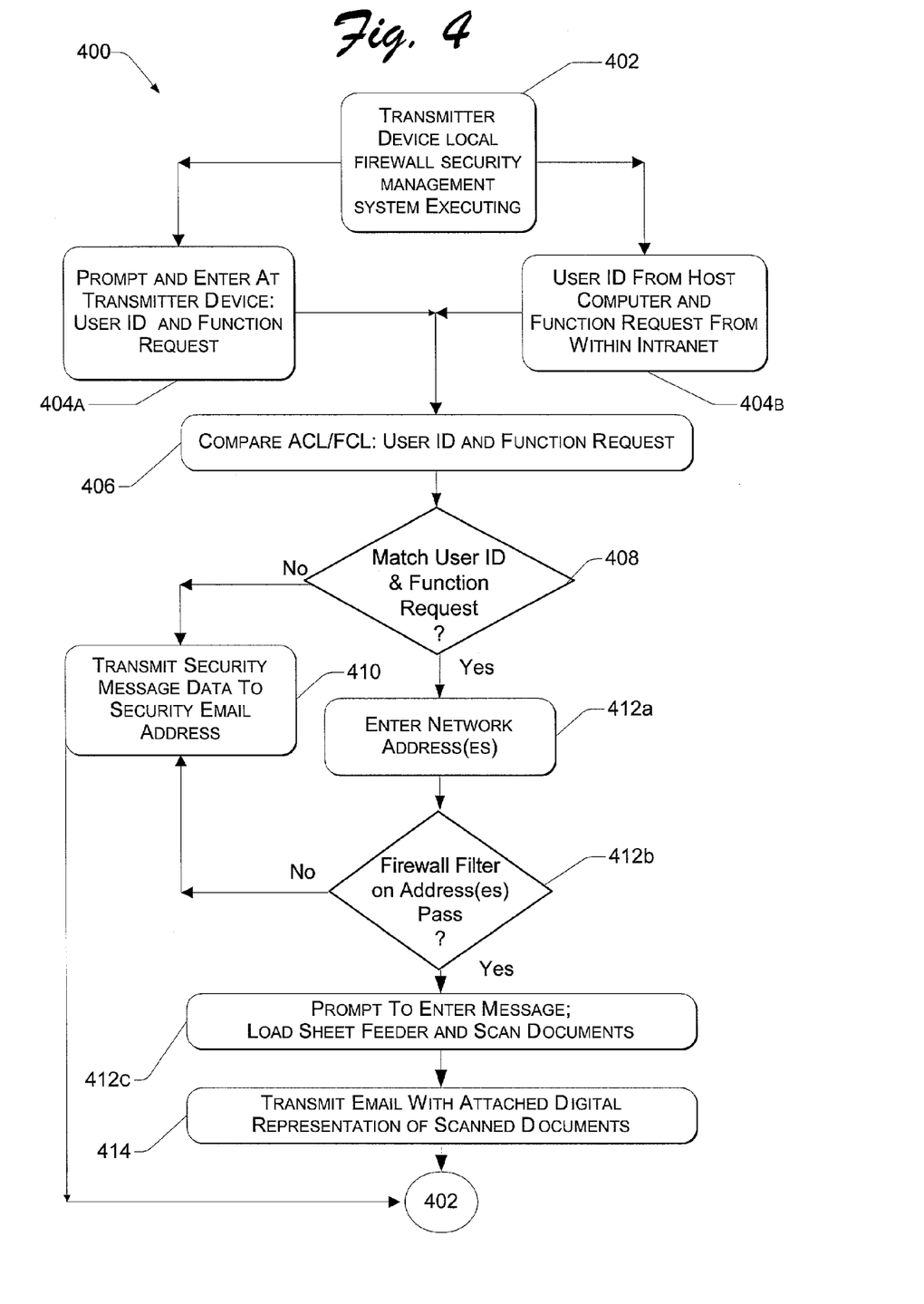
FIG. 4 is a flow diagram depicting a method for use in a computing and communication environment having a transmitter device in a system as in FIG. 1, for example, in accordance with certain exemplary embodiments of the present invention.

CPU 302 is configured to perform the operations described above. By way of further example, a flow diagram is depicted in FIG. 4 to illustrate certain exemplary functions that can be performed using CPU 302 and the other resources in transmitter device 102. Here, a process 400 is provided.

In step 402, digital transmitter device 102 initiates a function to be performed by its local firewall security management system. A request for the function to be initiated can be made by a user at step 404A by direct access to digital transmitter device 102, such as by making an input upon touch sensitive menu screen 310. Using touch sensitive screen 310, the user can be prompted to enter input data, such as, e.g., a user ID, a recipient(s) e-mail address information, the subject of the e-mail, the text or body of the e-mail, etc. The user then inputs at touch sensitive menu screen 310 the user ID, recipient address data to which facsimiles of a set of documents are to be sent, etc. The recipient address data may be, for example, an e-mail address or may also be a destination web site, local file folder, or other similar location. When the function is initiated by host computer 108 within intranet 101 at step 404B, the request transmitted from host computer 108 to digital transmitter device 102 will also include a user ID.

In either of the functions initiated at steps 404A of 404B, an ACL associated with the digital transmitter device, and for the input user ID in particular, is obtained at step 406. At step 408, the user ID of the request is compared to the ACL. If the user ID is authorized within the ACL, then another comparison is made at step 408 between the request function and the FCL to determine if the authorized user ID also has privileges for the particular request that was made to the digital transmitter device 102.

In the event that either the user ID or the requested function is not authenticated by the ACL/FCL comparison at step 408, then the digital transmitter device does not perform the requested function, a diagnostic can be displayed to the requesting user, and message data is generated by the digital transmitter device 102 at step 410. In step 410, the message data is addressed and transmitted to a security e-mail address and includes input received from the user at touch sensitive screen 310 or other input device, such as the user ID and the function that was requested of the digital transmitter device. Similar e-mail is sent when the unauthorized request is received from host computer 108 within intranet 101. Process 400 then returns to step 402 to accept additional requests from additional users.

In the even that the ACL and the FCL authenticates both the user ID and the requested function to be performed by digital transmitter device 102, then at step 412a the user can enter in the desired destination for the documents. This can consist of email addresses, distribution lists, a web site address, a file directory, or other similar location data. Then at step 412b the addresses are checked against the firewall filters and a decision is made whether or not to allow sending or transferal of the document to each destination address. The local firewall security management system can be configured to either block access to particular addresses and still permit delivery of the document to non-blocked addresses, or to block access to all addresses and return to step 402 similarly as described above. If the user ID, function request, and destination filtering tests have all passed, then at step 412c, a prompt is displayed on touch sensitive menu screen 310 for the user to place a set of documents into a sheet feeder device associated with digital transmitter device 102. The sheet feeder device then physically feeds each sheet in the set of documents to scanning mechanism 305. as the set of documents are scanned CPU 302 generates a bit map or other output that is a digital representation of the scanned documents. For example, the scanned object data may be included in the email message data as an attached file. The scanned object data may include Portable Document Format (PDF) formatted data, tagged image file format (TIFF) formatted data, Joint Photographic Experts Group (JPEG) formatted data, bit-map formatted data, optical character recognition (OCR) related data, American Standard Code for Information Interchange (ASCII) formatted data, and/or other forms of encoded data, including, e.g., encrypted data, etc.

In step 414, message data is addressed according to the recipient address data received from the user. The message data may, for example, include e-mail message data from the user of the digital transmitter device to the user(s) of the remote device(s). Here, an e-mail message would include the scanned object data in some manner.

In accordance with still other aspects of the present invention, CPU 302 may be configured to maintain at least one recipient address data list within memory 306. The recipient address data list may include a plurality of recipient addresses associated with a plurality of potential message data recipients. CPU 302 may also be configured to selectively modify the recipient address data list based on the received recipient address data from digital transmitter device 102.

Thus, although some preferred embodiments of the various methods and apparatuses of the present invention have been illustrated in the accompanying Drawings and described in the foregoing Detailed Description, it will be understood that the invention is not limited to the exemplary implementations disclosed, but is capable of numerous rearrangements, modifications and substitutions without departing from the scope of the invention as set forth and defined by the following claims.

What is claimed is:

1. A computer-readable medium having computer-executable instructions which, when executed on a processor, direct a computer to perform a method comprising:
   receiving at a transmitter device that is capable of sending data on a network a request from a user for transmission of user message data to a requested network, resource at a requested network address on the network;
   determining by the transmitter device if the requested transmission is proscribed because the request requires use of a function of the transmitter device that has not been predefined as a permitted function, or because the user has not been predefined as a permitted user; the determining further comprising retrieving a function access list (FAL) and comparing the function to the FAL;
   sending the transmission of the user message data to the requested network resource at the requested network address when the determination determines the requested transmission not to be proscribed; and
   issuing from the transmitter device a diagnostic when the determination determines the requested transmission to be proscribed.

2. The computer-readable medium as defined in claim 1, wherein when the receiving at a transmitter device further comprises:
   optically scanning at the transmitter device at least one object to form corresponding scanned object data; and
   forming in said user message data said scanned object data.

3. The computer-readable medium as defined in claim 1, wherein the receiving at a transmitter device further comprises receiving the user message data from a host computer in communication with the transmitter device through the network.

4. The computer-readable medium as defined in claim 1, wherein the issuing a diagnostic comprises sending diagnostic message data to a diagnostic network address of a network resource on the network that is not the requested network address.

5. The computer-readable medium as defined in claim 4, wherein
   the diagnostic message data includes the requested function.

6. The computer-readable medium as recited in claim 1, wherein said requested network address is selected from the group consisting of a user e-mail address, a distribution list, a web site address, and a file directory.

7. The computer-readable medium as recited in claim 1, wherein said transmitter device is included within a multiple function peripheral device, which further includes a printer device that is operatively coupled to said transmitter device.

8. A transmitter device capable of transmission of a network message on a network and having an input device and a processor for executing the computer-executable instructions as recited in claim 1.

9. The computer-readable medium of claim 1, wherein the function has not been predefined as a permitted function for the user but has been predefined as a permitted function for a different user.

10. The computer-readable medium of claim 1, wherein the function has not been predefined as a permitted function for any user.

11. An apparatus capable of sending message data, the apparatus comprising:
    a memory including an access control list (ACL) and a function control list (FCL);
    a scanning mechanism configurable to optically scan at least one object to form corresponding scanned object data;
    an input device to the memory to receive a user input that includes a user id and a function;
    logic, operatively coupled to said memory, and configured to compare the user id to the ACL and the function to the FCL;
    at least one network interface, operatively coupled to said logic, and configurable to:
    when the comparison is positive:
    form the scanned object data in a user message data;
    address the user message data using a first network address; and
    initiating a transmission to the at least one network interface of the user message data to the first network address;
    when the comparison is negative:
    determining the transmission is proscribed and issuing a diagnostic.

12. The apparatus as recited in claim 11, wherein said user input further comprises additional mail data and includes a plurality of network addresses associated with a plurality of intended message data recipients.

13. The apparatus as recited in claim 11, wherein:
    said apparatus is included within a multiple function peripheral device;
    said multiple function peripheral device further includes a printer device that is operatively coupled to said logic; and
    said logic is further configured to cause said printer device to selectively print at least one document corresponding to said user message data.

14. The apparatus as defined in claim 11, wherein:
    the user input further comprises user provided data selected from a group of data consisting of the first network address, subject data, and text data;
    the first network address is selected from a group of consisting of a user e-mail address, a distribution list, a web site address, and a file directory; and
    the logic is further configured to form said user message data by combining said scanned object data and the user provided data.

15. The apparatus as defined in claim 11, wherein the issue a diagnostic further comprises initiate a transmission to the at least one network interface of diagnostic message data to a second network address.

16. The apparatus as recited in claim 11, wherein said user input further comprises additional mail data and includes a plurality of network addresses associated with a plurality of intended message data recipients.

17. The apparatus as recited in claim 11, wherein:
said apparatus is included within a multiple function peripheral device;
said multiple function peripheral device farther includes a printer device that is operatively coupled to said logic; and
said logic is further configured to cause said printer device to selectively print at least one document corresponding to said user message data.

18. An apparatus capable of sending message data, the apparatus comprising:
a memory including an access control list (ACL) that defines a permitted user or a permitted network address, and a function control list (FCL) that defines whether a requested function that the apparatus is capable of performing is permitted;
a scanning mechanism configurable to optically scan at least one object to form corresponding scanned object data;
an input device to the memory to receive a user input that includes the requested function;
logic, operatively coupled to said memory, and configured to compare the requested function to the FCL;
at least one network interface, operatively coupled to said logic, and configurable to:
when the requested function is permitted:
form the scanned object data in a user message data;
address the user message data using a first network address; and
initiate a transmission to the at least one network interface of the user message data to the first network address;
when the requested function is not permitted by the ACL/FCL comparison:
determining the requested function is a proscribed function and issuing a diagnostic.

19. The apparatus as defined in claim 18, wherein:
the user input further comprises user provided data selected from a group of data comprising the first network address, subject data, and text data;
the first network address is selected from a group of consisting of a user e-mail address, a distribution list, a web site address, and a file directory; and
the logic is further configured to form said user message data by combining said scanned object data and the user provided data.

20. The apparatus as defined in claim 18, wherein the issue a diagnostic further comprises initiate a transmission to the at least one network interface of diagnostic message data to a second network address.

21. An apparatus capable of sending message data, the apparatus comprising:
a memory including at least one of an access control list (ACL) and a function access list (FAL);
a scanning mechanism configurable to optically scan at least one object to form corresponding scanned object data;
an input device to the memory to receive a user input that includes at least one of:
a user id of a user;
a requested function to be performed by the apparatus;
a requested network address selected from a group of consisting of a user e-mail address, a distribution list, a web site address, and a file directory;
logic, operatively coupled to said memory, and configured to compare the user input to the ACL and the FAL;
at least one network interface operatively coupled to said logic and configurable to:
when the comparison is positive:
form the scanned object data in a user message data;
address the user message data using the requested network address; and
initiating a transmission of the user message data to the requested network resource at the requested network address;
when the comparison is negative:
initiating a transmission of diagnostic message data to a network address of a network resource that is not the requested network address, wherein the diagnostic message data includes at least one of:
the user id;
the requested function; and
the requested network address.

22. A computer-readable medium having computer-executable instructions which, when executed by a processor, direct a computer to perform a method comprising:
receiving at a scanner at a first network address a request from a user for transmission of scanned image data to a network resource at a second network address, the receiving comprising accepting user input, including a user id and a requested function, through a user interface of said scanner;
determining by the scanner if the requested transmission is proscribed by comparing the user id to an access control list (ACL) and comparing the requested function to a function access list (FAL);
sending the scanned image data to said network resource when the requested transmission is not proscribed; and
issuing a diagnostic message, including the user id and the second network address, to a diagnostic resource at a third network address when the requested transmission is proscribed.

23. The computer-readable medium of claim 22, wherein the requested function is selected from a scanning resolution, a grey scale scanning mode, or a color scanning mode.

24. The computer-readable medium of claim 22, wherein the determining includes determining whether the requested transmission is proscribed because the second network address is a proscribed address.

* * * * *

UNITED STATES PATENT AND TRADEMARK OFFICE
CERTIFICATE OF CORRECTION

PATENT NO.         : 7,302,701 B2                                          Page 1 of 1
APPLICATION NO.    : 10/151670
DATED              : November 27, 2007
INVENTOR(S)        : Steven G. Henry It is certified that error appears in the above-identified patent and that said Letters Patent is hereby corrected as shown below:

In column 11, line 12, in Claim 17, delete "farther" and insert -- further --, therefor.

Signed and Sealed this

Tenth Day of June, 2008

JON W. DUDAS
*Director of the United States Patent and Trademark Office*